June 28, 1932. C. T. HOWSON 1,864,595
COFFEE GRINDER
Filed May 6, 1926 2 Sheets-Sheet 1
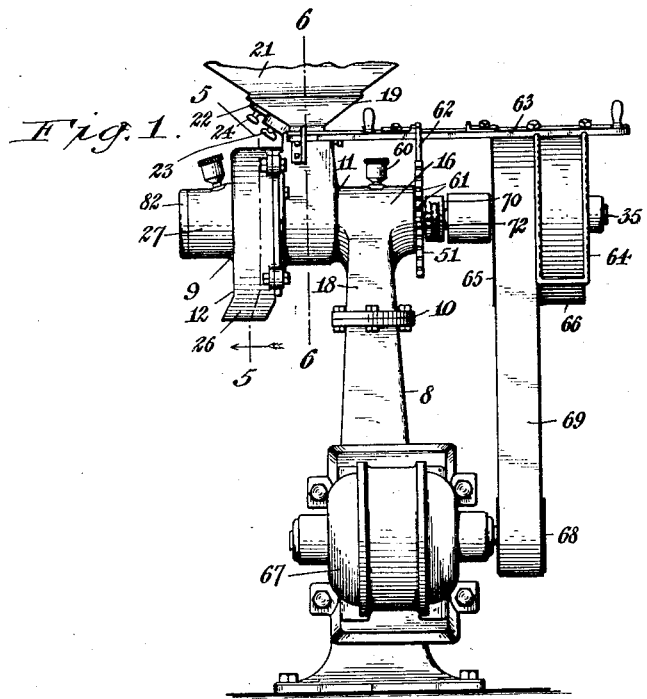
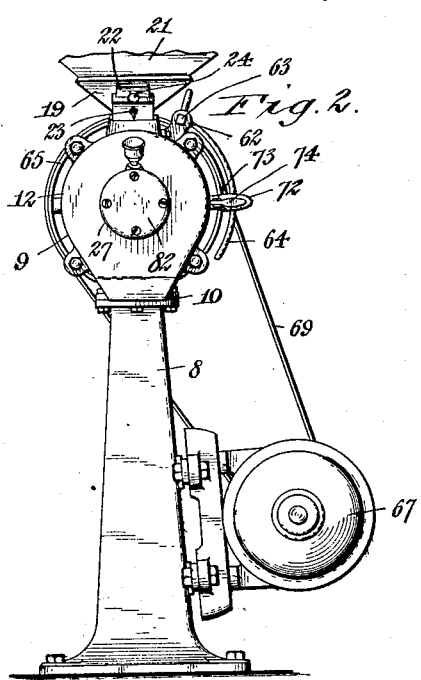
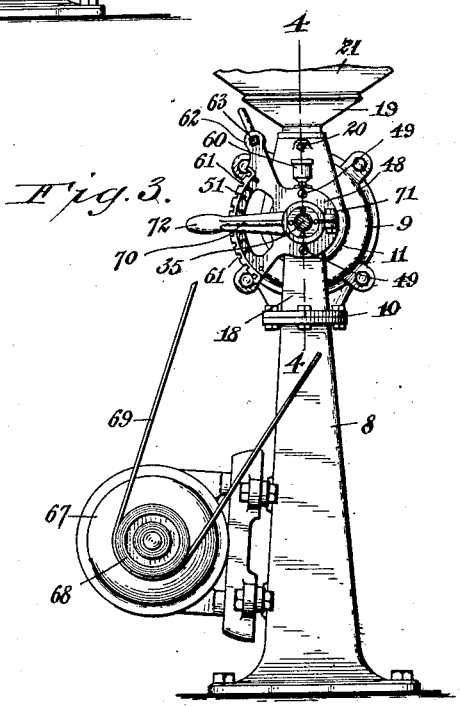
Charles T. Howson, Inventor.
Witness:
J. J. Oberst June 28, 1932.   C. T. HOWSON   1,864,595
COFFEE GRINDER
Filed May 6, 1926   2 Sheets-Sheet 2
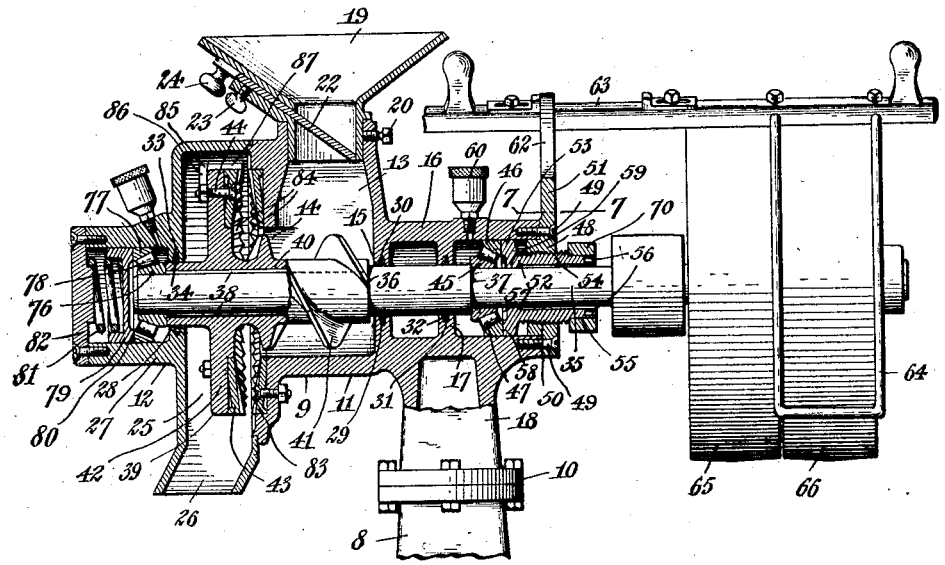
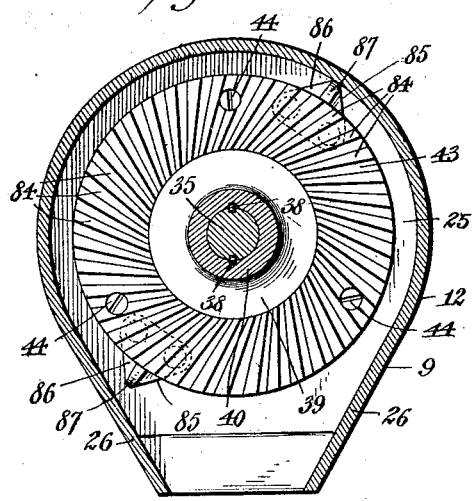
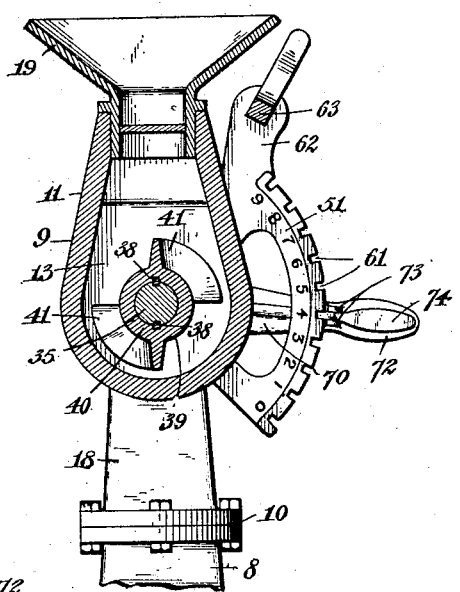
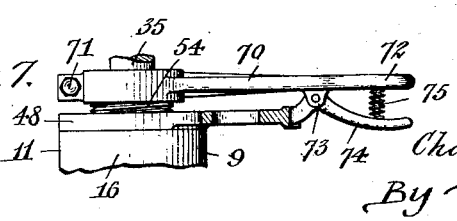
Charles T. Howson, Inventor.

Patented June 28, 1932

1,864,595

UNITED STATES PATENT OFFICE

CHARLES T. HOWSON, OF SILVER CREEK, NEW YORK, ASSIGNOR TO HUNTLEY MANUFACTURING CO., OF SILVER CREEK, NEW YORK, A CORPORATION OF NEW YORK

COFFEE GRINDER

Application filed May 6, 1926. Serial No. 107,094.

My invention relates to improvements in grinding machines, and more particularly in coffee grinders.

One of the objects of the invention is to provide a coffee grinder which is of simple construction, and in which two grinding elements are employed, one being mounted on a shaft having only two bearings adapted to receive both the radial and thrust load.

Another object of my invention is to provide a coffee grinder in which provision is made for automatically taking up the wear on the bearings and for allowing the separation of the grinding elements when hard foreign particles enter with the coffee, thereby preventing damage to said grinding elements.

A further object of my invention is to provide a machine which will be quiet under action and possess free running qualities, and in which the grinding elements, preferably in the form of plates or annuli, are maintained in perfect alignment.

A still further object of my invention is the employment of tapered roller bearings in connection with a thrust spring to keep the raceways of the roller bearings in contact with the rollers at all times and to keep the grinding elements in alignment and in perfect parallelism, regardless of the extent to which the bearings are worn.

With the above and other objects in view, to appear hereinafter, my invention consists in the novel features of construction and in the arrangement and combination of parts to be hereinafter described, and more particularly pointed out in the subjoined claims.

In the drawings:—

Fig. 1 is a side elevation of my improved machine, a portion of the feed hopper being broken away.

Figs. 2 and 3 are end elevations viewed from opposite ends.

Fig. 4 is an enlarged vertical longitudinal section, taken on line 4—4, Fig. 3.

Fig. 5 is an enlarged transverse vertical section, taken on line 5—5, Fig. 1, looking in the direction of the arrow crossing said line.

Fig. 6 is an enlarged transverse section taken on line 6—6, Fig. 1.

Fig. 7 is a horizontal section taken on line 7—7, Fig 4.

The mounting or support of the grinding machine is, in its preferred arrangement, in the form of a pedestal 8, which is fastened at its lower end to the floor and at its upper end has the casing 9 of the machine secured thereto, as at 10. The casing of the machine is formed in two parts 11, 12. The casing 9, and more particularly the part 11 thereof, has a receiving chamber 13 provided with a large opening or passage 14 at one end and a shaft opening 15 at its other end, and coaxial with said shaft opening is a sleeve extension 16 having an internal flange 17 between its ends and being open at its outer end. From this sleeve extension a depending portion 18 extends, which serves as a short standard for the casing and is connected to the upper end of the pedestal, previously referred to as the point where the casing is secured to the pedestal. The receiving chamber 14 has an opening in its top into which the neck of a hopper-shaped casting 19 is inserted, said casting being held in place by a set screw 20 threaded through one wall of the receiving chamber and bearing against said neck. This casting 19 forms part of a hopper 21, shown partly broken away in Figs. 1 to 3.

22 is a slidable gate which may be closed, fully opened, or only partly opened, and in any position it may be placed, it is retained by a set screw 23 threaded through a portion of said casting and bearing against the under or outer side of said gate. Said gate serves to control the feeding of stock to the receiving chamber and is provided with a handle 24 for conveniently sliding the same.

To the open end of the part 11 of said casing, the part 12 is secured, this part being of parti-cylindrical formation in cross section, as best shown in Fig. 5, and serves as a grinding chamber 25 having its peripheral or parti-cylindrical wall terminating in converging portions 26 forming a tapering outlet spout for said chamber. This part 12 of the casing is open at one end and this open end is placed against the part 11 so that the receiving chamber 13 is in communication therewith through the opening or passage 14.

On the outer end wall of the grinding chamber 25, a sleeve extension 27 is formed, and in said outer end wall an opening 28 is arranged. The wall of the opening 15 formed in the closed end of the receiving chamber 13 has an annular groove 29 formed therein which is filled with suitable packing 30, and the internal flange 17 is also provided with an annular groove 31 in which packing 32 is placed. The opening 28 in the outer end wall of the part 12 is also provided with an annular groove 33, in which packing 34 is placed.

Extending through the receiving chamber, the part 12 which serves as a grinding chamber, and the sleeve extension 16, and extending into the sleeve extension 27 is a shaft 35. The shaft is enlarged midway between its ends to form opposite shoulders 36, 37, one of which is within the receiving chamber and the other within the sleeve extension 16 outside of the internal flange 17 thereof. This shaft extends through the shaft opening 15 and through the opening formed by the internal flange 17 and the packing 30 and 32; said packing bearing against the enlarged intermediate portion of this shaft.

Fastened to the shaft by means of keys 38, or otherwise, is a combined conveyer and grinding element 39 in the form of a casting comprising a sleeve or elongated hub 40, spiral ribs 41 on said sleeve or hub, a wide flange or disk-like member 42 extending from said sleeve or hub and disposed within the grinding chamber, and a grinding plate or annulus 43 detachably applied to said flange or disk-like member by means of bolts 44, or otherwise. Said spiral rib extends from said flange or disk-like member 42 inwardly into the receiving chamber 14 of the casing and one end of the sleeve or hub of said combined conveyer and grinding element bears against the shoulder 36 on said shaft. The other end of said sleeve or hub extends into the opening 28 and the packing 34 within the groove of said opening bears against said sleeve or hub.

Within the sleeve extension 16 is a roller bearing comprising an outwardly-tapered inner raceway 45, which surrounds the shaft 35 and bears against the shoulder 37 thereof, an inwardly-flaring outer raceway 46 surrounding said inner raceway, and a series of tapered anti-friction rollers 47 between said raceways.

To the outer open end of said sleeve extension 16, a cap 48 is secured by means of screws 49, or otherwise, said cap having an internally-threaded axial opening 50 and a segment-like extension 51. An adjustable abutment is employed in connection with said roller bearing to keep the annular series of rollers 47 in firm rolling contact with the inner raceway, and the outer raceway in firm contact with said series of rollers. This adjustable abutment is in the form of a sleeve 52 having a head or enlargement 53 at its inner end adapted to rotatably and slidably fit within said sleeve extension and a threaded portion 54 extending outwardly from said head or enlargement to within a short distance of the outer end of said sleeve, the outer end portion of said sleeve being reduced in diameter, as at 55. The sleeve 52 is threaded through the cap 48 from the inner side when assembling the parts of the machine, and after placement within said cap, it is adjusted from the outer side thereof. For this purpose said adjusting sleeve has pin sockets 56 formed in its end for the reception of a pin wrench, or other suitable tool, by means of which the sleeve may be adjusted within the cap to abut against the outer raceway 46 of the roller bearing and maintain the series of anti-friction rollers in proper rolling contact with its two co-acting raceways.

The head or enlargement 53 of the adjustable abutment is provided with a depression 57 on its inner side so that an annular bearing portion 58 is formed which alone bears against the outer raceway of said roller bearing and said adjusting sleeve has its bore somewhat larger than the diameter of the shaft 35 which passes therethrough, said bore being provided at its inner end with an internal rib 59 which may be provided with packing similar to the flange 17 in the sleeve extension 16.

Provision is made for supplying the roller bearing within said sleeve extension 16 with a lubricant, and in preferred form, a cup 60 is threaded into said sleeve extension for this purpose. This cup is adapted to be filled with a semi-fluid lubricant to be delivered thereby into the sleeve extension so as to substantially surround or enclose the several parts of the roller bearing.

The segment-like extension 51 projects from one side of the cap 48 and is provided with a series of notches 61 along its outer edge, numbered from 0, or zero, upwardly. In the drawings, ten notches are shown which are numbered from 0 to 9, respectively.

The extension 51 has a guide arm 62 extending upwardly therefrom, and in this guide arm is mounted a shifter bar 63, which is further guided for slidable movement in any suitable manner and which carries a shifter arm 64 by means of which a belt (not shown) passed through said shifter arm, is adapted to be moved from a tight pulley 65 on the shaft 35, to a loose pulley 66 on said shaft, or reversely. This belt shifting mechanism is, however, only used when the machine is driven from a counter-shaft, but when driven from an individual motor, such as shown at 67 in the drawings, the tight pulley 65 only is utilized. The motor 67 is, of course, electrically operated and secured to the pedestal 8 of the machine, it having a pulley 68 on its shaft alined with the tight pulley 65, and around these pulleys a belt 69 is passed. It is to be noted, however, that this belt is not passed through the shifter arm 64 of the belt shifting mechanism, since in stopping the machine, a switch is employed to shut off the current from the motor, as will be quite apparent.

While I have shown the machine arranged to be operated by an electric motor, it is apparent that it is equipped to be driven from a counter-shaft without necessitating any changes whatsoever in the construction of the machine.

On the reduced outer end of the adjustable abutment 52, an adjusting lever 70 is secured, this lever having a split hub adapted to be slipped over the reduced outer end of the sleeve portion of said abutment, and by means of a clamping screw 71 passing through the lugs at the split portion of said hub, said lever is firmly fastened to said abutment. Said lever has a handle 72 terminating beyond the notched edge of the segment-like extension 51 and a pair of lugs 73 on its inner side between which is pivotally secured a latch-handle or dog 74, between which and the handle of the adjusting lever, an expansion spring 75 is interposed; said spring serving to keep the inner end of said latch-handle or dog in engagement with any desired one of the series of notches 61 in said segment-like extension, thus preventing rotation of the adjusting sleeve and permitting slight and convenient adjustment of said abutment within the cap 48.

Fastened to that end of the shaft 35, which extends into the sleeve extension 27 is an outwardly-tapered inner raceway 76 forming part of a roller bearing located within said sleeve extension, and adjustably arranged within the latter is an inwardly-flaring outer raceway 77. Between these two raceways is a series of tapered anti-friction rollers 78. The inner raceway 76 abuts with its inner end against the outer end of the sleeve or hub 40 forming part of the combined conveyer and grinding element, while a thrust element 79, slidably arranged within said sleeve extension, bears against the outer end of the outer raceway 77. This thrust element is in the form of a cup having an annular bearing portion 80 at its inner edge of substantially the same width as the outer end of said outer raceway, against which it bears; and extending into the outer cupped portion of said thrust element is an expansion spring 81, one end thereof bearing against said thrust element and its other end against a cap 82 fastened to the outer end of said sleeve extension 27.

The grinding plate or annulus 43 is detachably secured to the inner side of the flange or disk-like member 42, which is recessed from its edge inwardly to receive said grinding plate or annulus, and it is therefore movable, or more particularly stated, rotatable with the shaft 35, and co-acts with a detachable or replaceable grinding plate or annulus 83, which is fastened to the outer side of the wall separating the receiving chamber 13 from the grinding chamber 25. Said last-mentioned grinding plate or annulus is therefore non-rotatable or fixed, and opposed surfaces of both grinding plates or annuli are provided with grinding serrations or teeth 84.

Opposed faces of said grinding plates or annuli are disposed at a slight angle to each other so that they approach each other closest at their outer marginal portions and gradually recede inwardly to enlarge the space between them. As the coffee or other material to be ground is delivered to the grinding surfaces of these parts from a point near their centers, and since the grinding space between them becomes gradually diminished outwardly, the material moves outwardly toward the outer marginal portions of said surfaces and is gradually reduced to the desired fineness. Therefore, considerably less power is required than would otherwise be necessary, and furthermore, as the material has free access to the grinding space between said grinding surfaces, clogging of the material cannot take place.

By reason of the combined conveyer and grinding element 39 having its sleeve or hub 40 in contact with the shoulder 36 of the shaft 35, the thrust spring 81 exerts its force against said combined conveyer and grinding element, through the medium of the thrust element 79 and adjacent roller bearing, and forces the shaft to the right, as viewed in Fig. 4, with the result that the shoulder 37 of said shaft forces its adjacent roller bearing in firm contact with the adjustable abutment 49, thereby maintaining the series of anti-friction rollers of said last-mentioned bearing in proper rolling contact with its co-acting raceways and automatically taking up the wear between the parts of said bearing. This action of the thrust spring 81 also maintains the series of anti-friction rollers of the roller bearing within the sleeve extension 27 in proper rolling contact with its co-acting raceways and automatically takes up any wear between the parts of said roller bearing; at the same time, the combined conveyer and grinding element 39 is maintained so that the movable or rotatable grinding plate or annulus 43 will maintain its proper relation to the immovable or fixed grinding plate or annulus 83, which relation is determined by the adjustable abutment 52.

It will therefore be apparent that by the use of the roller bearing specified, the thrust spring 81 serves to keep the grinding plates in perfect alinement and in tram, without possibility of the slightest wabbling movement of the rotatable grinding plate or element, and provides a quiet and easy running machine.

Moreover, in the event that any hard substances contained within the material to be ground passes between the grinding surfaces of the machine, the movable or rotatable grinding plate or annulus will move away from the immovable or fixed grinding plate or annulus, this being allowed by the thrust spring 81, which becomes compressed to the required degree under such conditions.

For the purpose of keeping the walls of the grinding chamber 25 in clean condition, scrapers 85 are secured to the outer side of the flange or disk-like member 42 on the combined conveyer or grinding element. Each of these scrapers comprises a flat securing plate 86 lying against the outer side of said flange or disk-like member and extending beyond the edge thereof, and an inwardly-extending scraper arm 87 projecting from said flat securing plate and having its outer edge traveling in close proximity to the inner surface of the parti-cylindrical or peripheral wall of said grinding chamber, thus loosening all adhering matter and delivering the same into the tapered outlet or spout of said chamber.

Having thus described my invention, what I claim is:

1. In a grinding machine, the combination with a casing having opposite sleeve extensions, a shaft arranged within said casing and extending from a point within one of said sleeve extensions through said casing and through the other sleeve extension thereof, said shaft having an enlarged intermediate portion providing opposite shoulders, a roller bearing for one end of said shaft within one of said sleeve extensions comprising an outer and an inner raceway and an annular series of tapered rollers, a thrust element bearing against said outer raceway, a thrust spring exerting pressure against said thrust element, a sleeve on said shaft bearing with one end against one of said shoulders and having the inner raceway of said roller bearing bear against the other end thereof, a grinding element carried by said sleeve, a grinding element fixed to a wall of said casing for co-action with said first-mentioned grinding element, a roller bearing in the other sleeve extension of said casing comprising an inner raceway bearing against the other shoulder of said shaft, an outer raceway, and an annular series of tapered anti-friction rollers between said raceways, an adjustable abutment bearing against said last-mentioned outer raceway, and means for adjusting said adjustable abutment.

2. A grinding machine, comprising a casing having alined sleeve extensions and having also a fixed grinding element therein, a shaft extending through said casing including one of said sleeve extensions and terminating at one end within the other sleeve extension, said shaft having an enlarged intermediate portion forming opposite shoulders, a grinding element on said shaft rotatable therewith for co-action with said fixed grinding element and bearing against one of said shoulders, a roller bearing within one of said sleeve extensions having its inner raceway in contact with the other shoulder of said shaft, an adjustable abutment bearing against the outer raceway of said last-mentioned roller bearing, a second roller bearing within the other sleeve extension of said casing having its inner raceway bearing against said rotatable grinding element, a thrust element within said last-mentioned sleeve extension bearing against the outer raceway of said last-mentioned roller bearing, and a thrust spring exerting pressure against said thrust element.

3. A grinding machine, comprising a casing, a shaft having a shoulder and being rotatable within said casing, a roller bearing comprising an outwardly-tapered inner raceway mounted on said shaft and having its inner end against said shoulder, an inwardly-flaring outer raceway spaced from said inner raceway and a series of tapered rollers between said raceways, a detachable element applied to said casing and having a segment extension provided with a series of notches and a threaded opening co-axial with said shaft, an adjustable element threaded into said opening and bearing with its inner end against said outer raceway, and an adjusting lever secured to the outer end of said adjustable element and having a spring-actuated latch lever adapted to be entered in any one of the series of notches on said segment extension.

4. A grinding machine, comprising a casing having a fixed grinding element therein, an adjustable abutment at one end of said casing, a shaft within said casing extending outwardly through said abutment and having an enlarged intermediate portion forming two shoulders, a roller bearing within said casing comprising an inner raceway in contact with one of said shoulders, an outer raceway in contact with said adjustable abutment and an annular series of anti-friction elements between said raceways, a grinding element on said shaft rotatable therewith and in contact with the other shoulder of said shaft, a second roller bearing for said shaft having an inner raceway in contact with said rotatable grinding element, an outer raceway spaced from said inner raceway and a series of anti-friction elements between said raceways, a thrust element guided for movement within said casing and bearing against said last-mentioned outer raceway, and a thrust spring interposed between said thrust element and a fixed portion of said casing and exerting pressure against said thrust element to automatically take up wear on said bearings.

5. A grinding machine, comprising a casing, a shaft journaled within said casing and extending from one end thereof, said shaft having a shoulder thereon, grinding means within said casing carried in part by said shaft and in part by said casing, a roller bearing having an inner raceway and an outer raceway and having said inner raceway bearing against said shoulder, an adjustable abutment bearing against the outer raceway of said roller bearing and serving to maintain the parts of said grinding means in predetermined grinding relation, a lever for said adjustable abutment, co-acting means on said casing and lever for maintaining said adjustable abutment in any adjusted position, and yielding means exerting pressure against said shaft to hold said roller bearing against said abutment and thereby automatically maintain the parts of said grinding means in true alinement under all conditions of wear of said roller bearing.

In testimony whereof I affix my signature.

CHARLES T. HOWSON.